(12) United States Patent
Kim (10) Patent No.: US 11,597,037 B2
(45) Date of Patent: Mar. 7, 2023

(54) COMPONENT PRODUCED BY BRAZING AND METHOD OF PRODUCING SAME

(71) Applicants: Hyundai Motor Company, Seoul (KR); Kia Motors Corporation, Seoul (KR)

(72) Inventor: Ki Eun Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/984,481

(22) Filed: Aug. 4, 2020

(65) Prior Publication Data

US 2021/0187661 A1    Jun. 24, 2021

(30) Foreign Application Priority Data

Dec. 20, 2019 (KR) ........................ 10-2019-0171619

(51) Int. Cl.
*B23K 26/244* (2014.01)
*B23K 26/00* (2014.01)
(Continued)

(52) U.S. Cl.
CPC .......... *B23K 26/244* (2015.10); *B23K 1/0008* (2013.01); *B23K 1/0014* (2013.01); *B23K 1/0056* (2013.01); *B23K 26/0006* (2013.01); *B23K 26/21* (2015.10); *B23K 26/242* (2015.10); *B23K 26/323* (2015.10); *B23K 2101/006* (2018.08)

(58) Field of Classification Search
CPC ................ B23K 26/242; B23K 26/244; B23K 2101/006; B23K 1/0014; B23K 1/0008; B23K 1/0056; B23K 26/323; B23K 26/21
(Continued)

(56) References Cited

U.S. PATENT DOCUMENTS 6,241,307 B1 *  6/2001  Kim .................... B60J 5/101
                                                296/146.8
7,368,035 B2 *  5/2008  Wang .................. B23K 1/0008
                                                156/304.6
(Continued)

FOREIGN PATENT DOCUMENTS

JP       2003290951 A  * 10/2003
JP          5206284 B2 *  6/2013  ............. B23K 26/00
KR        100812414 B1     3/2008

OTHER PUBLICATIONS

Machine English Translation of JP-5206284-B2 (Year: 2013).*
(Continued)

*Primary Examiner* — Sang Y Paik
*Assistant Examiner* — Erwin J Wunderlich
(74) *Attorney, Agent, or Firm* — Slater Matsil, LLP (57) ABSTRACT

A method for producing a component by brazing and a related component are disclosed. The component may include a first part, a second part and a third part, wherein the first part includes a first junction part, the second part includes a second junction part and a cross junction part, and the third part includes a third junction part, and wherein the third junction part has a part and a remaining part. In an embodiment the method includes coupling the first part and the second part to each other by performing a preceding weld in a state of overlapping a part of the first junction part and the second junction part and, after performing the preceding weld, coupling the first part, the second part, and the third part to each other by performing a following weld.

18 Claims, 9 Drawing Sheets

(51) Int. Cl.
    *B23K 26/242*     (2014.01)
    *B23K 1/005*     (2006.01)
    *B23K 26/323*     (2014.01)
    *B23K 1/00*     (2006.01)
    *B23K 26/21*     (2014.01)
    B23K 101/00     (2006.01)

(58) Field of Classification Search
    USPC .................................................. 219/121.64
    See application file for complete search history.

(56) References Cited

U.S. PATENT DOCUMENTS

| | | | |
|---|---|---|---|
| 9,138,827 B2 * | 9/2015 | Lee ........................ | B23K 26/32 |
| 10,843,737 B2 * | 11/2020 | Yamazaki ............... | B21D 53/88 |
| 2005/0013954 A1 * | 1/2005 | Kaegi ................... | B21C 37/065 |
| | | | 228/173.6 |
| 2006/0163222 A1 * | 7/2006 | Dance .................. | B23K 15/085 |
| | | | 219/121.69 |
| 2016/0184916 A1 * | 6/2016 | Tanaka ................. | B23K 9/0253 |
| | | | 219/137 R |
| 2016/0264184 A1 * | 9/2016 | Ishihara .................. | B23K 11/11 |

OTHER PUBLICATIONS

Uchihara, Masato; "Joining technologies for automotive steel sheets," Sep. 16, 2008, Welding International, vol. 25, No. 4, pp. 249-259 (Year: 2008).*

Machine English Translation of JP-2003290951-A (Year: 2003).*

* cited by examiner

COMPONENT PRODUCED BY BRAZING AND METHOD OF PRODUCING SAME

CROSS-REFERENCE TO RELATED APPLICATIONS

This application claims priority to Korean Patent Application No. 10-2019-0171619, filed in the Korean Intellectual Property Office on Dec. 20, 2019, which application is hereby incorporated herein by reference.

TECHNICAL FIELD

The present invention relates to a component produced by brazing and a method of producing the same.

BACKGROUND

When brazing panels of steel or aluminum, or panels made of different materials from each other, laser brazing may be used depending on quality assurance and exterior design needs.

However, in a case of laser brazing a spring back phenomenon may occur after finishing brazing because the brazing is performed while two panels are pressed against each other. In particular, when welding lines of three or more panels intersect each other to be welded, two or more welding lines intersect each other. At an intersection point, a lifted gap between panels is generated due to a humped part at the end point of weld bead, thereby causing a problem of a poor weld.

In order to solve this problem, it is necessary to avoid welding areas being overlapped. However in that case, there is a problem in that realization of a design for a desired product becomes difficult.

The foregoing is intended merely to aid in the understanding of the background of the present invention, and is not intended to mean that the present invention falls within the purview of the related art that is already known to those skilled in the art.

SUMMARY

The present invention relates to a component produced by brazing and a method of producing the same. Particular embodiments provide a component produced by brazing and a method of producing the same, which may prevent a defect of a welding area from occurring when producing by brazing a plurality of panels having welding lines to be intersected with each other through laser brazing and the like.

Particular embodiments provide a component produced by brazing, the component including a first part in which a first junction part is configured, a second part in which a second junction part and a cross junction part intersecting the second junction part are configured, the second part coupled to the first part such that a part of the first junction part and the second junction part are overlapped, and a preceding weld is performed for the second junction part and the first junction part, and a third part in which a third junction part is configured, a part of the third junction part overlapped with an opposite part of the first junction part, a remaining part of the third junction part overlapped with the cross junction part, and the first part and the second part coupled to the third part by performing a following weld for each of overlapped parts, wherein the following weld intersects across a point spaced apart with a certain distance from a start point and an end point of the preceding weld.

The preceding weld and the following weld may be laser brazing.

The first junction part, the second junction part and the cross junction part, and the third junction part may be respectively configured on a first edge part, a second edge part, and a third edge part respectively formed along edges of the first part, the second part, and the third part.

The first part, the second part, and the third part may be made of same or different metals.

The second junction part and the cross junction part may be configured by dividing a section along an edge of the second part, whereby the second junction part and the cross junction part may be intersected each other at a point where the second junction part and the cross junction part meet each other.

A reinforcing flange bent upward to reinforce edge rigidity may be provided at an end part of the second edge part of the second part.

The second junction part may extend further toward outside from a position overlapped with the part of the first junction part, and the preceding weld may be performed starting with the second junction part extended toward outside of an edge of the first junction part, following along the edge of the first junction part, and finishing at the second junction part extended toward the outside of the edge of the first junction part.

A humped part of weld bead may be formed at the start point and the end point of the preceding weld.

The first part may be an upper panel of an outer panel assembly of a tailgate of a vehicle, the third part may be a lower panel of the outer panel assembly of the tailgate, and the second part may be an extension panel disposed between the upper and lower panels of the outer panel assembly of the tailgate.

In the first part and the third part, both side ends thereof may be welded to each other, a central part therebetween may be spaced apart from each other, the second part may be disposed in the central part, and the preceding weld and the following weld may intersect each other at an acute angle at a point where the first part, the second part, and the third part intersect each other.

A method of producing a component of embodiments of the present invention includes coupling a first part and a second part to each other by performing a preceding weld in a state of overlapping and pressurizing a part of a first junction part and a second junction part, and coupling the first part, the second part, and a third part to each other by pressurizing and performing a following weld while overlapping a part of a third junction part with an opposite part of the first junction part and overlapping a remaining part of the third junction part with a cross junction part, and allowing the following weld to intersect across a point spaced apart with a certain distance from a start point and an end point of the preceding weld.

In the coupling of the first part and the second part to each other, the preceding weld may be performed starting with the second junction part extended toward outside of an edge of the first junction part, following along the edge of the first junction part, and finishing at the second junction part extended toward the outside of the edge of the first junction part.

In the coupling of the first part and the second part to each other, a humped part of weld bead may be formed at the start point and the end point of the preceding weld.

The method may further include forming a reinforcing flange bent upward to reinforce edge rigidity at an end part of a second edge part of the second part, before the coupling of the first part and the second part to each other.

According to the component produced by brazing and the method of producing the same of embodiments of the present invention, it is possible to prevent a defect of a welding area from occurring when producing by brazing a plurality of panels having welding lines to be intersected with each other through laser brazing and the like.

DETAILED DESCRIPTION OF ILLUSTRATIVE EMBODIMENTS

Figure 1:
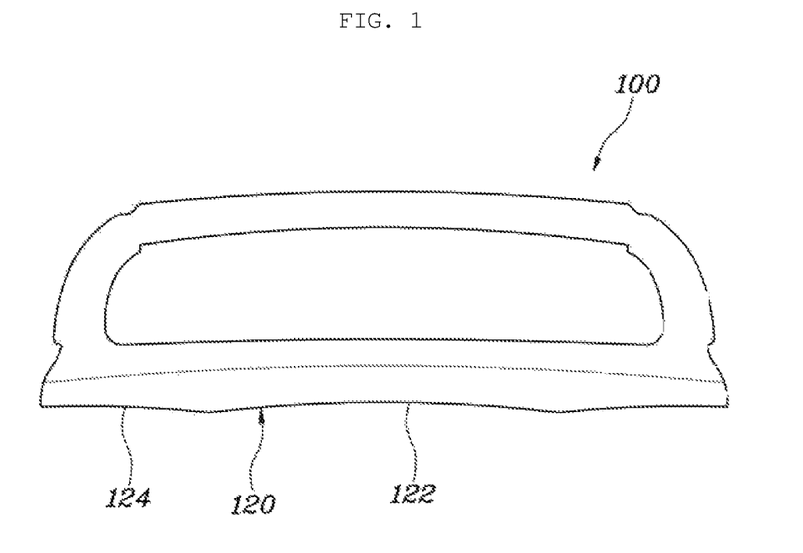
FIGS. 1 to 3 are views showing a first part, a second part, and a third part of a component produced by brazing according to an exemplary embodiment of the present invention.
Figure 2:
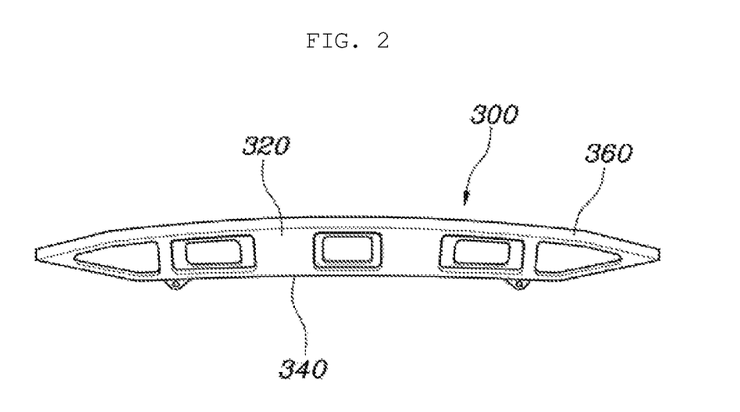
Figure 3:
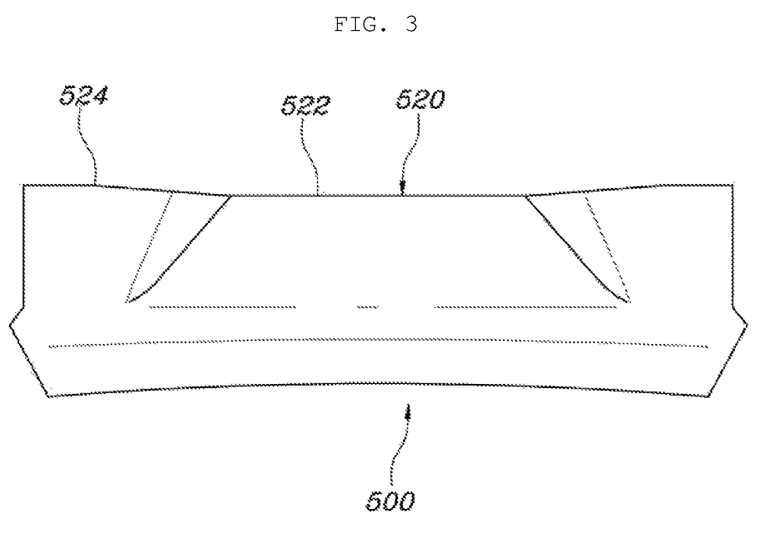
Figure 4:
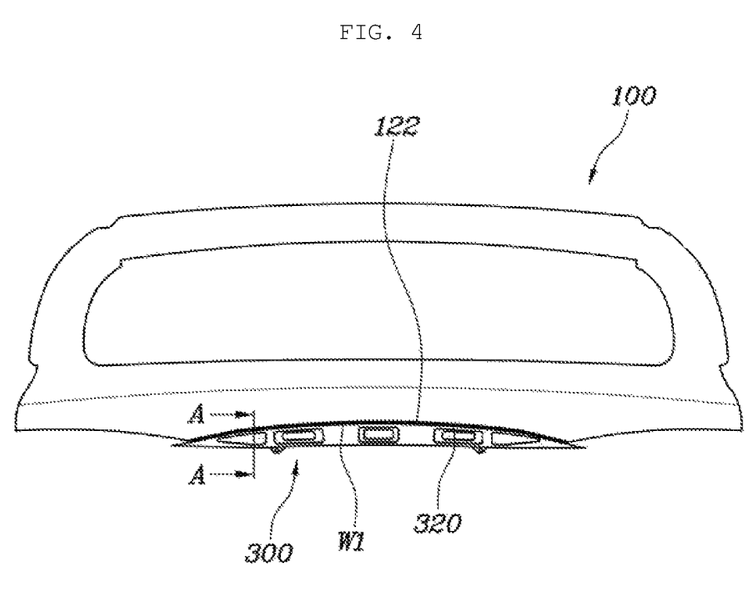
FIG. 4 is a view showing a state in which the first part and the second part of the component produced by brazing according to the exemplary embodiment of the present invention are coupled to each other.
Figure 5:
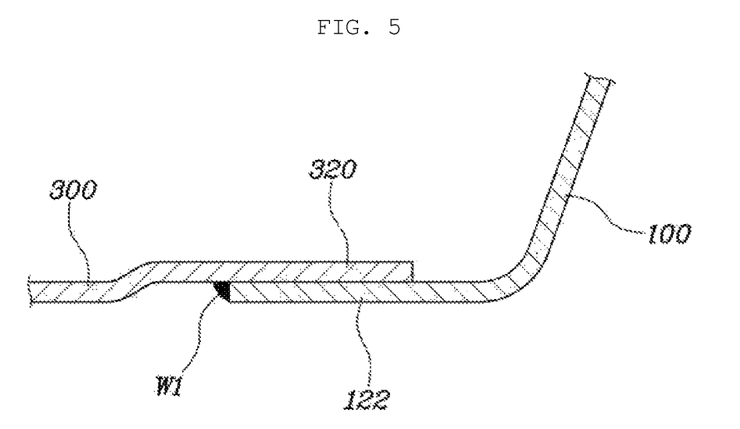
FIG. 5 is a cross-sectional view taken along line A-A of the component shown in FIG. 4.
Figure 6:
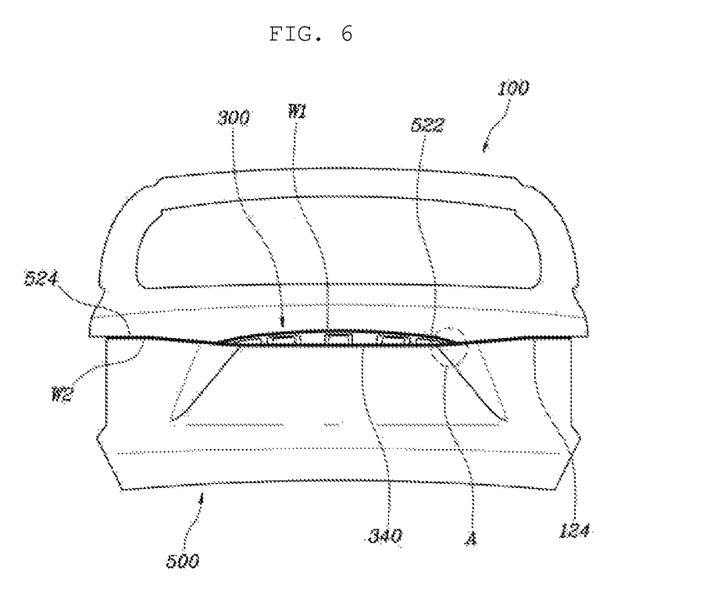
FIG. 6 is a view showing a state in which all components produced by brazing according to an exemplary embodiment of the present invention are coupled to each other.
Figure 7:
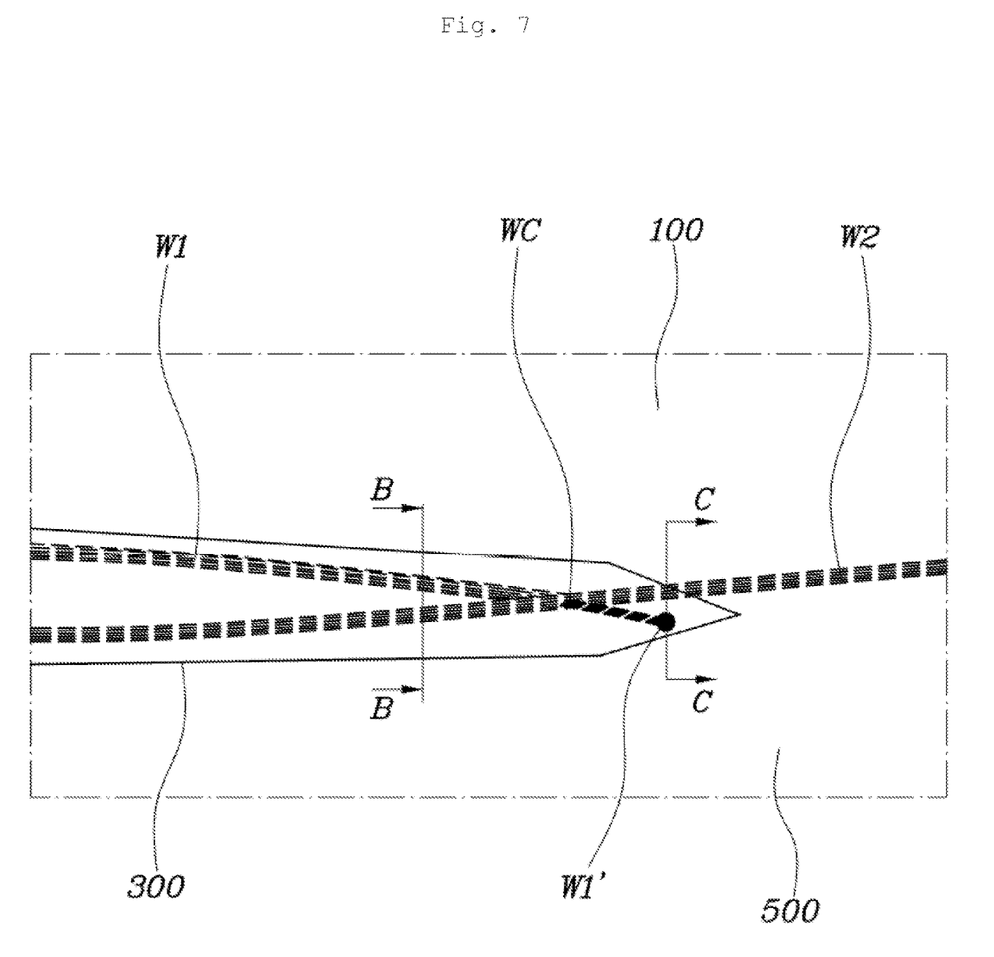
FIG. 7 is an enlarged view of a part A of the component shown in FIG. 6.
Figure 8:
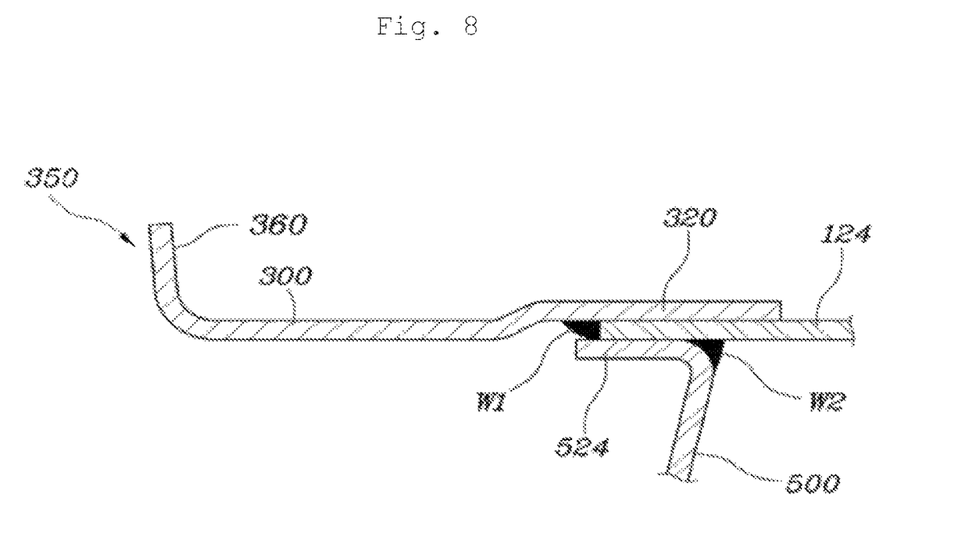
FIG. 8 is a cross-sectional view taken along line B-B of the component shown in FIG. 7.
Figure 9:
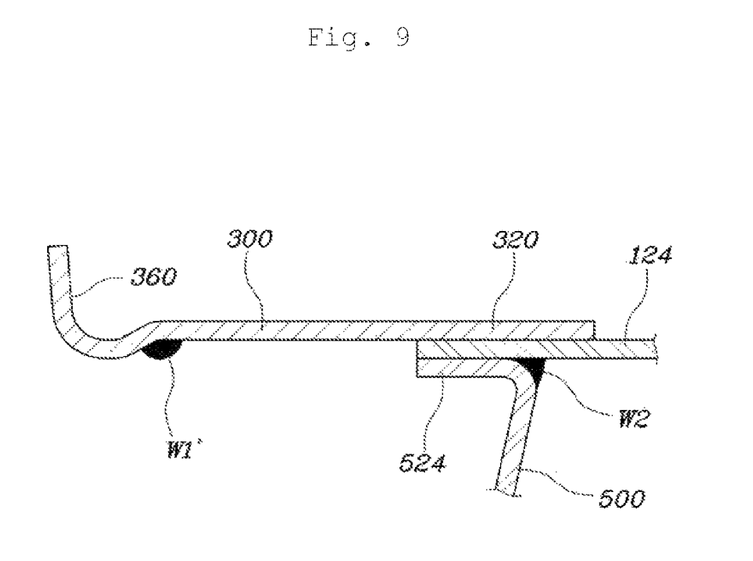
FIG. 9 is a cross-sectional view taken along line C-C of the component shown in FIG. 7.

FIGS. 1 to 3 are views showing a first part, a second part, and a third part of a component produced by brazing according to an exemplary embodiment of the present invention. FIG. 4 is a view showing a state in which the first part and the second part of the component produced by brazing according to the exemplary embodiment of the present invention are coupled to each other. FIG. 5 is a cross-sectional view taken along line A-A of the component shown in FIG. 4. FIG. 6 is a view showing a state in which all components produced by brazing according to an exemplary embodiment of the present invention are coupled to each other. FIG. 7 is an enlarged view of a part A of the component shown in FIG. 6. FIG. 8 is a cross-sectional view taken along line B-B of the component shown in FIG. 7. FIG. 9 is a cross-sectional view taken along line C-C of the component shown in FIG. 7.

Embodiments of the present invention relate to a component produced by brazing and a method of producing the same, which may prevent a defect of a welding area from generating when producing by brazing a plurality of panels having welding lines to be intersected with each other through laser brazing and the like.

FIGS. 1 to 3 are views showing the first part 100, the second part 300, and the third part 500 of the component produced by brazing according to an exemplary embodiment of the present invention. The component produced by brazing includes the first part 100 in which a first junction part 120 is configured, and the second part 300 in which a second junction part 320 and a cross junction part 340 intersecting the second junction part 320 are configured. The first part 100 is coupled to the second part such that a part 122 of the first junction part and the second junction part 320 are overlapped, and a preceding weld W1 is performed for the second junction part 320 and the first junction part 120. The component further includes the third part 500 in which a third junction part 520 is configured. A part 524 of the third junction part 520 is overlapped with an opposite part 124 of the first junction part, a remaining part 522 of the third junction part 520 and the cross junction part 340 are overlapped, and a following weld W2 is performed for each of the overlapped parts whereby the first part 100 and the second part 300 are coupled to each other. Also, the following weld W2 may intersect across a point spaced apart with a certain distance from a start point and an end point of the preceding weld W1.

Particularly, an embodiment of the present invention is a case where three or more parts are put together to form a singular component assembly, and for example, the panels are joined together by brazing.

An exemplary embodiment to which the present invention may be applied is an outer panel assembly forming an outer surface of a tailgate of a vehicle, wherein the first part 100 is an upper panel of the outer panel assembly of the tailgate of the vehicle, the third part 500 is a lower panel of the outer panel assembly of the tailgate, and the second part 300 may be an extension panel disposed between the upper and lower panels of the outer panel assembly of the tailgate. However, the technical idea of embodiments of the present invention is not only applied to the tailgate, but applicable to a door panel or various exterior panels of a vehicle, and further, to various industrial components.

In addition, embodiments of the present invention may be applied to a case where welding lines intersect each other, and the preceding weld W1 and the following weld W2 may be performed by laser brazing. Particularly, the laser brazing may be corresponded to laser brazing. As such, when two welding lines intersect each other, a humped part of weld bead W1' in which a weld bead is agglomerated is formed at a start point or an end point of a welding line previously made. When an additional panel is seated on this humped part of weld bead W1' and a following weld is performed, a lifted gap is generated on the additional panel, and thus a probability that the following weld has a defect becomes high.

In order to prevent such a case, an embodiment of the present invention clearly distinguishes each of the welding parts when brazing the second part 300, which is placed between the first part 100 and the third part 500, whereby an embodiment of the present invention ensures that the brazing is performed while avoiding the humped part of weld bead W1' at the end point of a welding part, and thus the overall welding quality is assured.

In particular, the first junction part 120, the second junction part 320 and the cross junction part 340, and the third junction part 520 may be respectively configured on the first edge part, the second edge part, and the third edge part respectively formed along the edges of the first part 100, the second part 300, and the third part 500. Each flange may be understood as a concept that defines a certain area of the edge of each part. In addition, the first part 100, the second part 300, and the third part 500 may be made of the same or different metal materials.

Meanwhile, as shown in FIG. 2, the second junction part 320 and the cross junction part 340 are configured by dividing a section along the edge of the second part 300, whereby the second junction part 320 and the cross junction part 340 may intersect each other at a point where the second junction part 320 and the cross junction part 340 meet each other. As shown, the second part 300 may be in the shape of an ellipse, the upper edge of which constitutes the second junction part 320, the lower edge of which constitutes the cross junction part 340, and the upper and lower edges may be configured to meet and intersect each other at both ends of the second part 300.

In addition, a reinforcing flange 360 bent upward to reinforce edge rigidity may be provided at an end part of the second edge part 350 of the second part 300. The reinforcing flange 360 represents a part bent upward as shown in the left end part of the second part in FIGS. 2, 8, and 9. As such, the rigidity of the second edge part 350 of the second part 300 is secured through the part bent upward.

In addition, as shown in FIG. 7, the second junction part 320 extends further toward the outside from a position overlapped with a part 122 of the first junction part 120. The preceding weld W1 is performed starting from the second junction part 320 extended toward the outside from an edge of the first junction part 120, following along the edge of the first junction part 120, and then ending at the second junction part 320 extended toward the outside from the edge of the first junction part 120. Through the process of such preceding weld W1, the humped part of weld bead W1' at the end point of the preceding weld W1 is to be positioned sufficiently offset outward.

Laser brazing is a method in which a filler wire melted by a laser heat source is attached to a surface of a base material, is introduced into a gap between panels by a capillary phenomenon, and bonds the panels, whereby a humped weld bead is formed at the start and end points of the laser brazing.

Accordingly, when producing a tailgate of a vehicle by brazing, the brazing starts at the edge part of the extension panel adjacent to the reinforcing flange of the extension panel, and thus no gap is formed for the welding material to be permeated thereinto by the capillary phenomenon, and a humped weld bead is inevitably generated at the corresponding part. In a case when other panels are matched, while having the humped weld bead, a lifted gap between the panels is generated by the humped weld bead. When laser brazing is performed in this state, the weld bead is permeated into the lifted gap by the capillary phenomenon, and thus the shape of the laser brazing bead becomes poor in appearance.

In the case of the present invention, as shown in FIGS. 7 and 9, the humped part of weld bead W1' of the preceding weld W1 is positioned in a state where the second part 300 is sufficiently extended outward, whereby the third part 500 is positioned while avoiding the humped part of weld bead W1' of the preceding weld W1 even though being matched for brazing. Accordingly, as shown in FIG. 8, in the state where the third part 500 is matched to the first part wo by a stable surface adhesion manner, the following weld W2 is performed, and thus poor brazing is prevented from occurring.

In addition, as shown in FIG. 6, in the first part 100 and the third part 500, both side ends thereof are welded to each other, the central part therebetween provides a space between the first part 100 and the third part 500, whereby an empty space is formed in the central part and the second part 300 is disposed at the central part of the empty space. In addition, at a point where the first part 100, the second part 300, and the third part 500 all intersect each other, the preceding weld W1 and the following weld W2 intersect each other at point WC at an acute angle as shown in FIG. 7.

Such a method of producing the component of embodiments of the present invention by brazing includes coupling the first part and the second part to each other by performing the preceding weld in a state of overlapping and pressurizing a part of the first junction part and the second junction part, and coupling the first part, the second part, and the third part to each other by pressurizing and performing the following weld while overlapping a part of the third junction part with an opposite part of the first junction part and overlapping a remaining part of the third junction part with the cross junction part, and allowing the following weld to intersect across a point spaced apart with a certain distance from the start point and the end point of the preceding weld.

In addition, in coupling the first part and the second part to each other, the preceding weld should be performed starting with the second junction part extended toward the outside of the edge of the first junction part, following along the edge of the first junction part, and finishing at the second junction part extended toward the outside of the edge of the first junction part.

In addition, in coupling the first part and the second part to each other, the humped weld bead is to be formed at the start point and the end point of the preceding weld.

In addition, before coupling the first part and the second part to each other, the method may further include forming the reinforcing flange which is bent upward at the end part of the second edge part of the second part to reinforce edge rigidity.

According to the component produced by brazing and the method of producing the same of embodiments of the present invention, it is possible to prevent a defect of a welding area from occurring when producing by brazing a plurality of panels having welding lines intersecting each other through laser brazing and the like.

Although preferred embodiments of the present invention have been described for illustrative purposes, those skilled in the art will appreciate that various modifications, additions and substitutions are possible, without departing from the technical scope and spirit of the invention as disclosed in the accompanying claims.

What is claimed is:

1. A method of producing a component comprising a first part, a second part and a third part, wherein the first part comprises a first junction part, the second part comprises a second junction part and a cross junction part, and the third part comprises a third junction part, and wherein the third junction part comprises a part and a remaining part, the method comprising:
   coupling the first part and the second part to each other by performing a preceding weld in a state of overlapping a part of the first junction part and the second junction part; and
   after performing the preceding weld, coupling the first part, the second part, and the third part to each other by performing a following weld while overlapping the part of the third junction part with an opposite part of the first junction part and overlapping the remaining part of the third junction part with the cross junction part, and allowing the following weld to intersect across the preceding weld at a distance from a start point and an end point of the preceding weld,
   wherein a space is provided at a central part between the first part and the third part when both side ends of the first part and the third part are respectively welded to each other,
   wherein the second part is located in the central part,
   wherein the preceding weld and the following weld intersect each other at an acute angle, and wherein the first part is an upper panel of an outer panel assembly of a tailgate of a vehicle, the third part is a lower panel of the outer panel assembly of the tailgate, and the second part is an extension panel located between the upper panel and the lower panel.

2. The method of claim 1, wherein the preceding weld is performed at the second junction part along an edge of the first junction part.

3. The method of claim 2, wherein a humped part of a weld bead is formed around the start point and the end point of the preceding weld.

4. The method of claim 1, further comprising forming a reinforcing flange bent upward to reinforce an edge rigidity at an end part of an edge part of the second part, before coupling the first part and the second part to each other.

5. A method of producing a component, the method comprising:
   overlapping a first junction part of a first part and a second junction part of a second part;
   performing a preceding weld to couple the first part and the second part to each other;
   overlapping a part of a third junction part of a third part with a part of the first junction part and overlapping a remaining part of the third junction part with a cross junction part of the second part; and
   after performing the preceding weld, performing a following weld to couple the first part, the second part, and the third part to each other, the following weld intersecting across the preceding weld at a distance from a start point and an end point of the preceding weld,
   wherein a space is provided at a central part between the first part and the third part when both side ends of the first part and the third part are respectively welded to each other,
   wherein the second part is located in the central part, and
   wherein the preceding weld and the following weld intersect each other at an acute angle, and wherein the first part is an upper panel of an outer panel assembly of a tailgate of a vehicle, the third part is a lower panel of the outer panel assembly of the tailgate, and the second part is an extension panel located between the upper panel and the lower panel.

6. The method of claim 5, wherein the preceding weld is performed at the second junction part along an edge of the first junction part.

7. The method of claim 6, wherein a humped part of a weld bead is formed around the start point and the end point of the preceding weld.

8. The method of claim 5, further comprising forming a reinforcing flange bent upward to reinforce an edge rigidity at an end part of an edge part of the second part, before performing the preceding weld.

9. The method of claim 5, wherein the preceding weld comprises laser brazing and the following weld comprises laser brazing.

10. A component comprising:
    a first part comprising a first junction part;
    a second part comprising a second junction part and a cross junction part meeting and intersecting the second junction part, wherein the second part is coupled to the first part such that a part of the first junction part and the second junction part are overlapped, and the second junction part and the first junction part are welded at a preceding weld; and
    a third part comprising a third junction part, wherein a part of the third junction part is overlapped with an opposite part of the first junction part and a remaining part of the third junction part is overlapped with the cross junction part, wherein the first part and the second part are welded to the third part by a following weld for each of the first part, the second part and the third part, and wherein the following weld intersects across the preceding weld in a distance from a start point and an end point of the preceding weld,
    wherein a space is provided at a central part between the first part and the third part when both side ends of the first part and the third part are respectively welded to each other,
    wherein the second part is located in the central part,
    wherein the preceding weld and the following weld intersect each other at an acute angle, and wherein the first part is an upper panel of a panel assembly of a tailgate of a vehicle, the third part is a lower panel of the panel assembly of the tailgate, and the second part is an extension panel located between the upper panel and the lower panel.

11. The component of claim 10, wherein the preceding weld and the following weld are laser welds.

12. The component of claim 10, wherein the first junction part, the second junction part and the cross junction part, and the third junction part are respectively configured to be formed along edges of the first part, the second part, and the third part.

13. The component of claim 10, wherein the first part, the second part, and the third part are made of same metals.

14. The component of claim 10, wherein the second junction part and the cross junction part are configured by dividing a section along an edge of the second part, and wherein the second junction part and the cross junction part intersect each other at a point where the second junction part and the cross junction part meet each other.

15. The component of claim 10, further comprising a reinforcing flange bent upward at an end part of an edge part of the second part and configured to reinforce an edge rigidity.

16. The component of claim 10, wherein the second junction part extends toward an edge part of the second part from a position overlapped with the part of the first junction part, and wherein the preceding weld is located along the edge part of the first junction part at the second junction part.

17. The component of claim 16, wherein a humped part of a weld bead is formed around the start point and the end point of the preceding weld.

18. The component of claim 10, wherein at least two of the first part, the second part, and the third part are made of different metals.

* * * * *